United States Patent
Knutson

(10) Patent No.: US 6,945,891 B2
(45) Date of Patent: *Sep. 20, 2005

(54) POWER TRANSMISSION BELT AND METHOD

(75) Inventor: Paul S. Knutson, Aurora, CO (US)

(73) Assignee: The Gates Corporation, Denver, CO (US)

( * ) Notice: Subject to any disclaimer, the term of this patent is extended or adjusted under 35 U.S.C. 154(b) by 92 days.

This patent is subject to a terminal disclaimer.

(21) Appl. No.: 10/319,987

(22) Filed: Dec. 16, 2002

(65) Prior Publication Data

US 2003/0130077 A1 Jul. 10, 2003

Related U.S. Application Data

(63) Continuation-in-part of application No. 10/050,806, filed on Jan. 14, 2002, now Pat. No. 6,695,733
(60) Provisional application No. 60/261,721, filed on Jan. 12, 2001.

(51) Int. Cl.$^7$ ................................................. F16G 1/06
(52) U.S. Cl. ...................... 474/260; 474/263; 474/268; 474/271; 156/137
(58) Field of Search ................................. 474/260–266, 474/204–205, 271–273; 156/137–142, 315; 428/378, 367, 392, 394

(56) References Cited

U.S. PATENT DOCUMENTS

| | | | |
|---|---|---|---|
| 2,507,852 A | 5/1950 | Case | |
| 3,078,206 A | 2/1963 | Skura | |
| 3,138,962 A | 6/1964 | Haines | |
| 3,200,180 A | 8/1965 | Ross | |
| 3,250,653 A | 5/1966 | Celst | |
| 3,772,929 A | 11/1973 | Redmond | |
| 3,855,870 A * | 12/1974 | Schnackenberg | 474/260 |
| 3,900,680 A | 8/1975 | Fix | |
| 4,066,732 A | 1/1978 | Redmond | |
| 4,710,155 A * | 12/1987 | Matsuoka et al. | 474/260 |
| 4,869,711 A * | 9/1989 | Komai | 474/263 |
| 4,936,814 A | 6/1990 | Colley et al. | |
| 4,978,409 A * | 12/1990 | Fujiwara et al. | 156/315 |
| 5,120,280 A * | 6/1992 | Mizuno et al. | 474/260 |
| 5,310,386 A | 5/1994 | Mizuno et al. | |
| 5,478,286 A * | 12/1995 | Hamano et al. | 474/271 |
| 5,609,541 A * | 3/1997 | Tachibana et al. | 474/205 |
| 5,735,763 A * | 4/1998 | Kawahara et al. | 474/263 |
| 5,807,194 A * | 9/1998 | Knutson et al. | 474/268 |
| 6,500,531 B2 * | 12/2002 | Manabe et al. | 428/295.1 |
| 6,685,785 B1 * | 2/2004 | Morris et al. | 156/137 |
| 2003/0130077 A1 | 7/2003 | Knutson | |

FOREIGN PATENT DOCUMENTS

| | | | | |
|---|---|---|---|---|
| DE | 19963304 | | 6/2000 | |
| DE | 100 29 470 A | | 3/2002 | |
| EP | 0429 284 | | 5/1991 | |
| JP | 56 105135 | | 8/1981 | |
| JP | (63-135631) A | * | 6/1986 | F16G/1/28 |
| JP | (06-330466) A | * | 11/1994 | D06M/15/70 |
| JP | (08-199484) A | * | 8/1996 | D06M/15/55 |
| JP | (10-81862) A | * | 3/1998 | C09J/109/08 |
| WO | WO 00/29762 A | | 5/2000 | |
| WO | WO 02/055920 A | | 7/2002 | |

* cited by examiner

Primary Examiner—Marcus Charles
(74) Attorney, Agent, or Firm—C. H. Castleman; S. G. Austin; J. A. Thurnau

(57) ABSTRACT

A power transmission belt, and more particularly a toothed power transmission belt, comprising a longitudinally extending tensile member composed of one or more carbon fiber cords, wherein the belt exhibits belt growth of not more than 0.1% based on its original length after 48 hours under High Temperature Belt Growth Analysis performed at 100° C., a method for producing such belts exhibiting reduced belt growth, and a method for reducing the angular vibration of a camshaft in relation to a crankshaft in an internal combustion engine wherein the camshaft is driven by a timing belt.

13 Claims, 3 Drawing Sheets

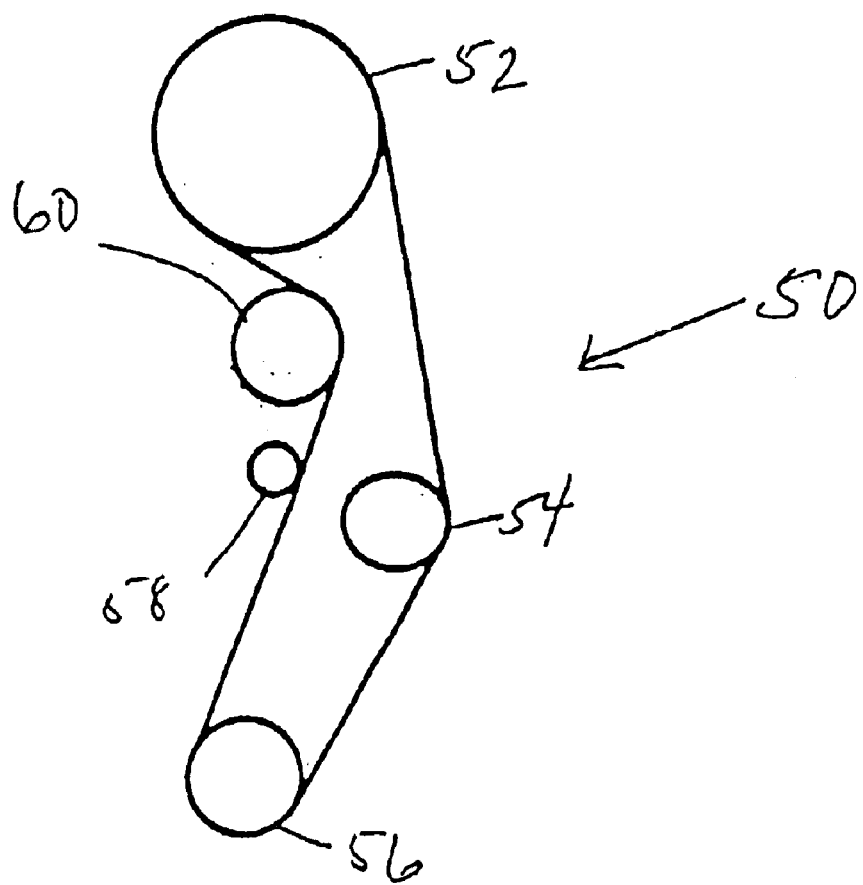

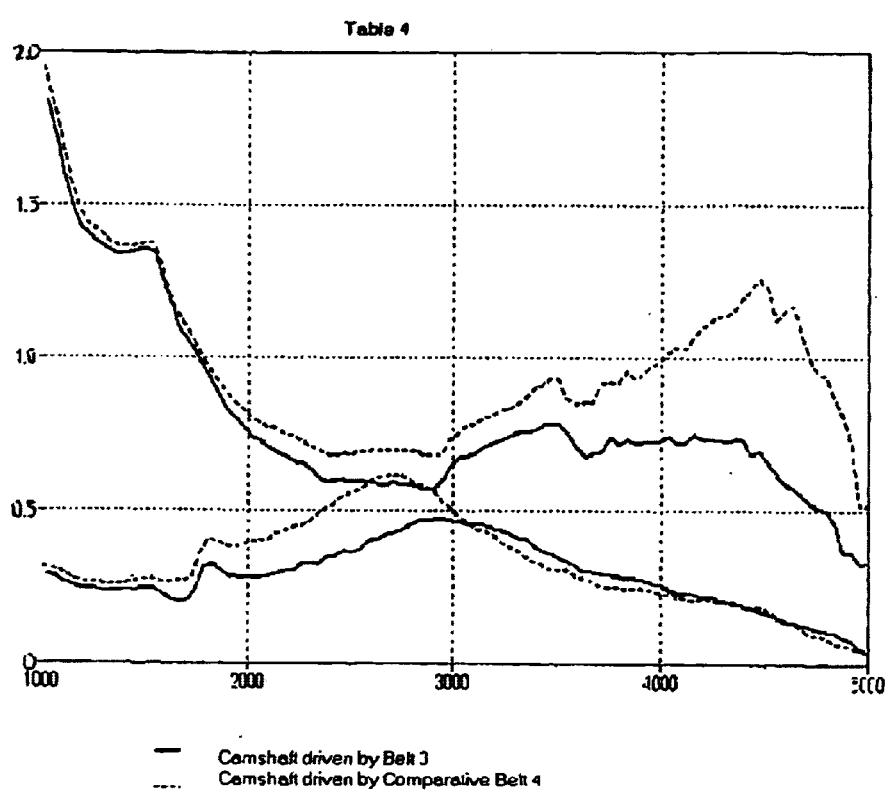

POWER TRANSMISSION BELT AND METHOD

CROSS-REFERENCES TO RELATED APPLICATIONS

This application is a Continuation-in-part of U.S. patent application Ser. No. 10/050,806, filed 14 Jan. 2002, now U.S. Pat. No. 6,695,733, which claims the benefit of U.S. Provisional Application No. 60/261,721, filed 12 Jan. 2001.

BACKGROUND

1. Field of the Invention

The invention relates to power transmission belts including V-belts, multi-v-ribbed belts and toothed power transmission belts, and more particularly to such belts comprising a longitudinally extending tensile member comprising one or more cords, at least one of which being formed of a carbon fiber yarn, and to a toothed belt for providing piston-to-valve synchronization in automotive internal combustion engine, and to a method for reducing the angular vibration of a camshaft in relation to a crankshaft in an internal combustion engine in which the camshaft is driven by a toothed belt.

2. Description of Related Art

Power transmission belts are commonly used to transmit power as between pulleys. They may be subjected to extremes in temperature and in loading during normal operation. By virtue of their composite structure, comprising both relatively low modulus cured elastomer body portions and a relatively high modulus tensile member defining the primary load carrying component of the belt, and the extremes in loading and temperature to which they may be routinely put, a high degree of durability, flexibility, and consistency are required of each of the component parts.

One particular problem associated more commonly but not exclusively with the utilization of toothed belts is that of belt growth, which constitutes a permanent deformation of the belt, and can occur as a result of extended operation, extreme dynamic loading, extreme temperatures, improper component selection, or combinations of the foregoing. In particular, if the materials surrounding the tensile member are insufficiently heat resistant, operation at relatively high temperature can so embrittle those materials that they no longer effectively bond the tensile member to the surrounding belt body, leading to a drop in belt tensile strength and hence rapid belt growth. Such permanent deformation of the belt leads to improper tooth-groove interaction, tensile failure and ultimately to catastrophic failure of the tensile cord.

The introduction of carbon fiber as a reinforcement material in rubber composite articles has presented the possibility of improved performance for some applications due to its relatively high modulus compared to conventional fibers, e.g., glass cord. To date however, adhesion of the fibers to the surrounding elastomer component for extended operating lifetimes and related problems have not been adequately resolved. U.S. Pat. No. 5,807,194 discloses the use of carbon fiber as the tensile cord in a toothed power transmission belt construction possessing urethane belt body portions. That disclosure is limited to carbon fiber cord having a cord treatment, which allows for its incorporation within the belt composite structure, involving the cord picking up various amounts of the urethane belt material itself during the belt-casting process. The castable nature of the urethane material itself, i.e., its liquid form prior to a curing step, allows the urethane to flow about the carbon fibers and within the interstices thereof. The disclosure is inapplicable however to belt constructions involving non-castable elastomer belt body portions, e.g., hydrogenated acrylonitrile butadiene rubber ("HNBR"), and polychloroprene rubber ("CR").

Toothed belts for use in driving a camshaft in internal combustion engines exemplified by automotive engines are faced with particular problems impacting their durability. The operating engine and each of its individual parts contributes vibration to the engine system, both as a result of the imbalance that exists between the rotating- and reciprocating engine parts, and of the angular oscillations of the shafts that are the result of the repetitive combustion impulses, i.e., the ignition of each of the cylinders, that create angular forces on the crank- and camshafts. Such vibration has been related to fatigue failure of timing belts. Particularly in the case of synchronous belts used to drive a plurality of components and/or in interference-type engines exemplified by diesel engines wherein there is very little clearance between the valve and piston, failure of the timing belt can cause severe and costly engine damage.

SUMMARY OF THE INVENTION

The present invention, according to one embodiment, provides a power transmission belt comprising a belt body formed of a cured elastomer composition, and a tensile member comprising a cord comprising at least one yarn formed of a carbon fiber, embedded in the belt body. The carbon fiber according to an embodiment of the invention is characterized by a tensile modulus in the range of from 50 giga Pascals ("GPa") to about 350 GPa and includes a cord treatment formed of a resorcinol-formaldehyde resin/rubber later solution ("RFL") possessing an elastic modulus selected to result in belt growth of not more than 0.1% at 100° C. after 48-hours under High Temperature Belt Growth Analysis. According to another embodiment, a method for manufacturing a power transmission belt possessing improved belt growth resistance is provided, comprising the steps of selecting the elastic modulus of a cord treatment for application to the yarn and/or one or more of its fibers farming the tensile cord such that it is within the range of from about $1.0 \times 10^7$ to about $5.0 \times 10^8$ dynes/cm$^2$ (about $1.0 \times 10^6$ to about $5.0 \times 10^7$ Nm$^{-2}$) at 20° C., and it is within the range of from about $5.0 \times 10^6$ to about $3.0 \times 10^8$ dynes/cm$^2$ (about $5.0 \times 10^5$ to about $3.0 \times 10^7$ Nm$^{-2}$) at 100° C.

In a further embodiment of the present invention, a toothed belt for driving a camshaft in an automotive internal combustion engine is provided, comprising a belt as described above.

In yet a further embodiment of the present invention a method is provided for reducing the angular vibration of a camshaft in relation to an associated crankshaft in an automotive internal combustion engine wherein the camshaft is driven by a toothed belt, comprising the step of selecting as the tensile member of the belt a cord formed of at least one yarn comprising a carbon fiber.

BRIEF DESCRIPTION OF THE SEVERAL VIEWS OF THE DRAWINGS

Other features and advantages of the invention will be apparent after reviewing the figures and descriptions thereof, wherein:

FIG. 3 is a schematic representation of a motored engine test configuration utilized to characterize a further aspect of the present invention; and FIG. 4 is a graph illustrating the reduction in the angular vibration of a camshaft of an internal combustion engine verses engine rpm using a toothed belt in accordance with the invention, contrast with use of a comparative toothed belt.

DETAILED DESCRIPTION

Figure 1:
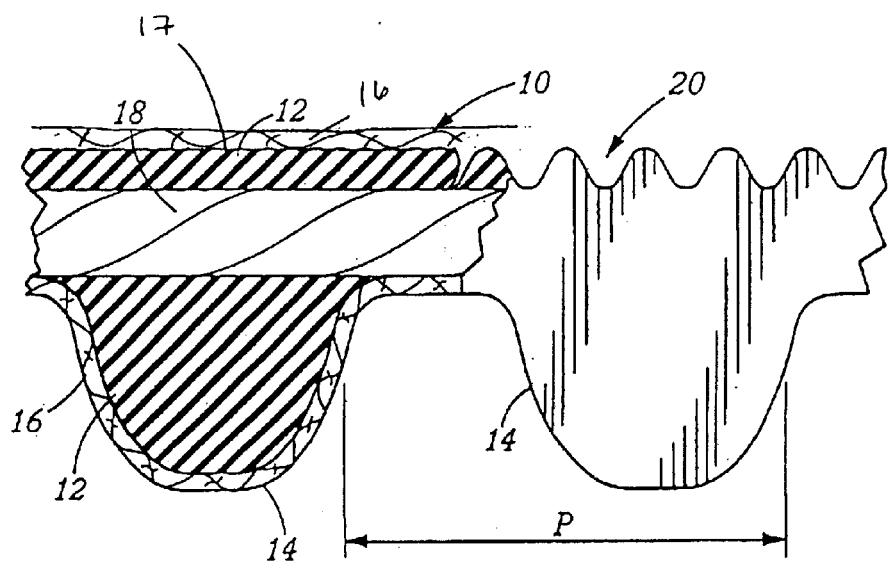
FIG. 1 is a partial longitudinal section view, partially cut away in cross-section, showing a belt in accordance with an embodiment of the invention with an embedded cord and belt teeth.

Referring to FIG. 1 a belt 10 of the invention in the form of a toothed power transmission belt is shown generally. The belt 10 includes a body 12 formed of any suitable cured elastomer composition, with belt teeth 14 formed of the body and spaced apart at a pitch P. The teeth and/or the opposite, back surface 17 of the belt are optionally covered with a wear-resistant fabric 16 as shown and as known in the art, disposed along peripheral surfaces of the belt teeth, and/or along the peripheral surface of the belt back surface 17, respectively. Non-limiting examples of belt back surface fabrics and uses therefor are illustrated in German Patent No. DE10029470C2, the contents of which with respect to same is hereby incorporated by reference. In this illustrated embodiment a tensile member 18 of helically spiraled cord is embedded in the belt body 12.

For utilization in the belt body elastomer composition, any suitable and/or conventional elastomer type may be employed, including both castable and non-castable elastomers and also thermoplastic elastomers. As non-castable elastomers, HNBR, CR, acrylonitrile butadiene rubber ("NBR"), styrene-butadiene rubber ("SBR"), alkylated chlorosulfonated polyethylene ("ACSM"), epichlorohydrin, to butadiene rubber ("BR"), natural rubber ("NR") and ethylene alpha olefin elastomers such as ethylene propylene terpolymer ("EPDM") and ethylene propylene copolymer ("EPM"), or a combination of any two or more of the foregoing may beneficially be employed.

As castable elastomers suitable for use as the belt body elastomer of the belts in accordance with the subject invention, urethanes, urethane/ureas and ureas are mentioned as non-limiting examples. For castable elastomers, the body is cast of a liquid belt material that, when cured, has the requisite physical characteristics required of a power transmission belt. For example, the material may have the properties as disclosed in any of U.S. Pat. No. 4,838,843 to Westhoff, U.S. Pat. No. 5,112,282 to Patterson et al., or in WIPO Publication No. 96/02584 (Feb. 1, 1996) to Wu et al.

Figure 2:
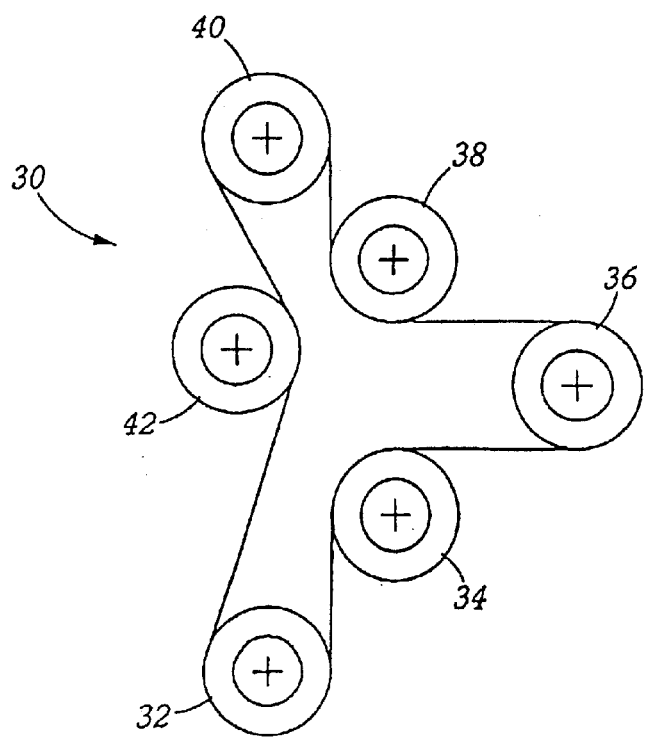
FIG. 2 is a schematic representation of a test configuration utilized to characterize an aspect of the present invention.

Conventional elastomer composition additives including fillers, curatives, activators, accelerators, scorch retarders, stabilizers, antioxidants, antiozonants and plasticizers may be utilized in conjunction with the elastomer constituent itself to form the power transmission belt body portions, in amounts conventionally employed for this purpose. The belts of the subject invention, which may be toothed as illustrated in FIGS. 1 and 2, but may also be in the form of a V-belt or a multi-v-ribbed belt, may be fabricated using known belt-building techniques, any number of which would be readily appreciated by one skilled in the relevant art. Examples of power transmission belts, including toothed or synchronous belts, V-belts, and multi-V-ribbed belts are disclosed in U.S. Pat. Nos. 3,138,962; 3,200,180; 4,330,287; and 4,332,576. Examples of methods for producing such belts are disclosed in U.S. Pat. Nos. 3,200,180, 3,772,929 and 4,066,732. Further methods for forming toothed belts in particular are described in the following U.S. Pat Nos. 2,507,852 to Case; 3,250,653 to Geist et al.; and 3,078,206 to Skura, the contents of each with regard to such methods is hereby incorporated by reference. These patent references are merely examples of various types of power transmission belts and state-of-the-art formation techniques thereof.

The elastomer composition for utilization in the belt body portion may optionally include fibers as is well known in the art, utilizing such conventional materials as meta-aramids, para-aramids, polyester, polyamide, cotton, rayon and glass, as well as a combination of any two or more of the foregoing. The fibers may be fibrillated or pulped, as is well known in the art where possible for a given fiber type, to increase their surface area, or they may be chopped or in the form of a staple fiber. The fibers may have a length in the range of from about 0.1 to about 10 mm, and may optionally be treated with an adhesive treatment to increase their adhesion to the elastomer. Suitable levels of fiber loading vary with the particular type of belt body elastomer, fiber type and intended application, but any level up to about 50% by weight of the final cured elastomer composition may be employed in the practice of the present invention. Alternatively, suitable fiber-loading levels may be in the range of from about 0.5 to about 20 phr; or from about 0.9 to about 10.0 phr, or from about 1 to about 5 phr.

A plurality of transversely oriented grooves 20 may optionally be formed in an outer layer of the belt. While not necessary, the grooves 20 reduce belt weight and may enhance belt flexibility in some applications or under certain circumstances, particularly wherein a castable material is used to form the belt body.

The spaced teeth 14 formed of the body may have any desired cross-sectional shape such as trapezoidal, curvilinear, or curvilinear truncated. Examples of curvilinear tooth shapes appear in U.S. Pat. Nos. 3,756,091 to Miller, 4,515,577 to Cathey et al. and 4,605,389 to Westhoff.

As the optional wear resistant fabric 16 disposed at one or both of the belt's back surface 17 and the peripheral surface of the belt teeth for promoting tooth sheer strength and, in castable belt constructions in particular, for reducing aggressiveness of the belt teeth when entering grooves of a sprocket, any suitable or conventional material may be employed, including crimped nylon, cotton, hemp, jute, aramid, polyester, and fiberglass. More than one ply of fabric may be employed. If desired the fabric may be cut on a bias so that the strands form an angle with the direction of travel of the belt. The fabric may be of any desired configuration such as a conventional weave consisting of warp and weft threads at any desired angle, or may consist of pick cords, or of a knitted or braided configuration or the like.

In this illustrated embodiment the tensile member 18 in the form of a cord is helically spiraled across the width of the belt in spaced side-by-side fashion. The cord in non-limiting embodiments of the invention may occupy from about 75 to about 95 percent of the belt width, and preferably from about 80 to about 92 percent of the belt width.

The cord comprising the tensile member comprises a plurality of twisted and/or bundled yarns at least one of which comprises a yarn of carbon fiber of any suitable type. In the present context and throughout this disclosure, the terms "fiber" and "filament" are utilized interchangeably to designate a material having a small cross-sectional diameter, e.g., 4–7 $\mu$m, and a length at least about one hundred times it's diameter, but generally having an exceedingly great or even indefinite length; and which forms the basic element of a yarn. The term "yarn" is utilized herein and throughout this disclosure to designate at least two, but generally with regard to carbon fiber yarns, one thousand or more fibers that are laid and/or twisted and/or otherwise bundled together in a continuous strand to form a component of a cord. The term "cord" is utilized throughout this disclosure to designate the product of one or more yarns that may be twisted as is known in the art, and where two or more yarns are employed, may moreover be laid and/or bundled and/or twisted together.

Exemplary carbon fibers for utilization in the practice of an embodiment of the present invention are described for example in aforementioned U.S. Pat. No. 5,807,194, the contents of which, with regard to illustrative carbon fiber types, configurations and designations that may be utilized in the practice of embodiments of the present invention, are incorporated herein by reference. Carbon fiber is generally made by carbonizing another fiber such as polyacrylonitrile fiber wherein in the carbonizing process the diameter of the fiber is substantially reduced. Yarns formed from one or more carbon fibers may for instance have a mass per unit length of from about 66 tex to about 1650 tex, and a filament count (i.e., number of individual carbon fibers per yarn) of from about 1000 to about 24000. The carbon fiber for use in accordance with the present invention possesses a tensile modulus in the range of from about 50 GPa to about 350 GPa; preferably of from about 100 GPa to about 300 GPa; and most preferably of from about 150 GPa to about 275 GPa, as determined in accordance with ASTM D4018. In embodiments of the present invention wherein the cross-sectional diameter of the individual carbon fibers is in the range of from about 4 to about 7 $\mu$m, the filament count of the cord utilized in the power transmission belt may be from about 5000 to about 24,000. In further embodiments the cord's filament count may be from about 9,000 to about 15,000. As is well known in the art, carbon yarn and cord formed therefrom may be characterized by the number of fibers contained therein rather than by denier or decitex. A nomenclature of numbers and the letter "K" are used to denote the number of carbon fibers in a yarn. Thus, in a "3K" carbon fiber yarn, the "K" is an abbreviated designation for "1000 fibers", and the "3" designates a multiplier. Thus "3K" carbon yarn identifies a yarn of 3000 fibers or filaments. Moreover with regard to cord nomenclature, in a "3K-5" carbon fiber cord for example, the "5" indicates that five 3K yarns are twisted and/or otherwise bundled together to thus form cord having a filament count of 15,000. In embodiments of the invention, the carbon fiber cord comprises any combination of yarns suitable for a given application, including but not limited to 6K-1; 3K-3; 6K-2; 12K-1; 3K-4; 3K-5; 6K-3 and 6K-4.

Non-limiting examples of carbon fibers suitable for use in practicing the subject invention are made available commercially by Toray under the references TORAYCA-T400 HB 6K 40D and TORAYCA-T700 GC 12K 41E; and similar materials are also available formerly through BP Amoco Chemicals Co, presently through Cytec Carbon Fibers LLC, under the references T-650/35 6K 309NT and T-650/35 12K 309NT.

Fiber manufacturers typically coat fibers with a sizing, which generally serves to inhibit fracturing as the fiber is processed into yarns and wound onto spools, and/or to facilitate wetting of the fibers and yarns formed therefrom with cord treatment(s). In some instances, the sizing may thus have a chemical structure that is compatible with a cord treatment applied to the yarns and/or filaments for incorporation of treated cord into a power transmission belt, and may for example thus be a water- or solvent-based epoxy solution. Throughout the present disclosure, the term, "sizing" is used to denote a generally thin film applied to a yarn and/or yarn filament at a level of from about 0.2 to 2.0% dry weight, i.e., based on the weight of the dried, so treated yarn or filament, i.e., the dried yarn or filament to which the sizing had been applied, in order to function as hereinabove described.

In accordance with an embodiment of the present invention, an RFL composition, i.e., an elastomer latex composition further comprising a resorcinol-formaldehyde reaction product, is applied as a cord treatment to at least a portion of the yarn and/or one or more of its carbon filaments. Throughout the present disclosure, the term, "cord treatment" is used to denote a material applied to a yarn and/or yarn filament (which may or may not include a sizing) and located at least on a portion of the yarn- and/or yarn filament surface and within at least a portion of one or more interstices formed between such filaments and yarn(s) of a cord formed through the bundling and/or twisting and/or other combination or configuration of such cord-treated yarn; and being applied to such yarn and/or yarn filament at a level greater than 2.0% based on the final weight of the so treated cord.

As the RFL constituents, any suitable materials may be employed. The resorcinol-formaldehyde resin fraction in the RFL solution preferably represents from about 2 to about 40% by weight dry basis, with the latex fraction representing from about 60 to about 98%. Preferably, the resorcinol-formaldehyde resin fraction represents from 5 to 30% by weight dry basis, and the latex fraction represents from 70 to 95%. This proportion in an embodiment of the present invention has been found to allow for the various filaments of the carbon fiber to be impregnated sufficiently to reduce abrasion and breaking thereof, while maintaining sufficient flexibility necessary to accomplish the twisting and cabling operations conventionally employed and, with regard to specific embodiments of the invention set forth herein, is described in further detail below. Irrespective of the particular fractions of resorcinol-formaldehyde resin and latex employed or the pick-up level achieved however, it has been found in the practice of the present invention that the solids level of the cord treatment solution should be brought to and maintained at a point wherein the RFL solution remains substantially stable during the treatment process.

The latex component in the RFL solution may be of any suitable type, including HNBR, NBR, carboxylated HNBR, carboxylated NBR, vinyl pyridine/styrene butadiene rubber ("VP/SBR"), carboxylated VP/SBR, SBR, chlorosulfonated polyethylene ("CSM"), ethylene alpha-olefin-type elastomer such as ethylene propylene diene terpolymer ("EPDM") and ethylene propylene copolymer ("EPM"), or a combination of any two or more of the foregoing. In a preferred embodiment, the latex component is a carboxylated HNBR type, and may include minor to up to equal amounts or proportions by weight or more of other elastomer types, including ethylene alpha-olefin-type elastomers such as EPDM or EPM. Ethylene alpha olefin elastomer may be utilized singly or in combination of any two or more thereof to improve low temperature performance properties of the resultant belt, such as low temperature flexibility.

In accordance with an embodiment of the present invention, an amount of cord treatment is applied to the yarn sufficient to coat at least a portion of the yarn surface and within at least a portion of the interstices formed between individual fibers thereof. In embodiments of the present invention a cord treatment pick-up level is achieved in the range of from about 5.5% to about 30%; preferably of from about 7% to about 25%; and more preferably of from about 7.5% to about 24% dry weight, based on the final weight of the so treated cord.

In an embodiment of the present invention, zero-twist (i.e., untwisted) carbon fiber yarn or a yarn bundle comprising at least one carbon fiber is dipped into an impregnation bath containing the RFL cord treatment; the thus-impregnated fiber yarn is dried; the yarn or yarn bundles are thereafter twisted to an appropriate configuration for the particular cord type employed, and the thus-coated cords, which may optionally include an additional overcoat of a suitable cord adhesive applied to the surface of the cord, are incorporated in the belt structure utilizing any conventional or suitable method, as set forth above. In the present context and throughout this disclosure the term "overcoat" is utilized to designate a material applied to the surface of a cord, but not generally residing within interstices formed between individual yarns and/or fibers thereof; generally at a level in the range of from about 1% to about 10% dry weight, based on the final weight of the so treated cord, which functions to facilitate adhesion of the treated cord to the surrounding belt materials.

In a non-limiting embodiment of the present invention, in carrying out the cord treatment steps, the cord treatment is allowed to penetrate within the yarns, and to within the interstices formed between individual fibers of the yarns and of the fibers themselves, so as to cover as many filaments of the yarns as possible, including those at the core of the yarn, after application of the cord treatment to the yarn and/or one or more of its fibers. Any suitable method to so maximize the amount of cord treatment pick-up of RFL in the cord may be but is not necessarily employed in the practice of the present invention. In one embodiment however, the coating process described above furthermore includes the step, performed at the latest during the impregnation step, of opening carbon yarns by spreading out filaments of which they are composed, so that each fiber presents an increased area over which the impregnation step can take place. This opening or spreading of the yarns may be formed by any suitable operation.

According to an embodiment of the present invention, it has been surprisingly found that by selecting the elastic modulus of the RFL cord treatment through the manipulation of one or more variables, it may be optimized for the particular power transmission belt construction to yield a belt that exhibits reduced permanent belt growth as measured after 48 hours under High Temperature Belt Growth Analysis performed at 100° C., as further described below.

Modulus selection of the RFL cord treatment in accordance with an embodiment of the subject invention may be achieved in a number of ways, including by adjusting the cord processing conditions including the temperature to which the cord is exposed and/or the exposure period of the cord treatment-impregnated yarn during the treatment process (hereafter, the "processing conditions"); adding relatively small amounts of a filler such as carbon black to the RFL cord treatment solution for impregnation in the carbon fibers; manipulating the formaldehyde:resorcinol weight ratio in the RFL; manipulating the resorcinol formaldehyde resin:latex weight ratio in the RFL, adding a minor amount of an aqueous dispersion of conventional antioxidant to the cord treatment solution, selecting a latex type for the RFL solution, and adding a blocked isocyanate to the RFL.

It has been surprisingly found in accordance with an embodiment of the present invention that by manipulating the elastic modulus of the RFL composition used as the cord treatment of the carbon fibers in accordance with an embodiment of the subject invention to an optimum level, a significant reduction in belt growth results. It is moreover presently believed that with respect to minimizing permanent belt growth, an optimum RFL elastic modulus exists for a carbon fiber having a tensile modulus at a particular level. While not intending to be bound by any particular theory, it is presently believed that an optimum cord treatment elastic modulus exists for any type of power transmission belt tensile cord, which results in a minimum permanent belt growth value for that construction.

Moreover, it has been found that the treated cord processing conditions, i.e., at least one of the elevated temperature and exposure period to which the cord is exposed after application of the RFL solution, can be manipulated with significant impact on the cord's final moisture content, its stiffness and the resultant belt's ability to resist belt growth as illustrated in the examples and accompanying descriptions thereof provided below. It is presently believed for example with regard to an exposure temperature or period that is too low for a given RFL composition and/or cord type, that while the treated cord's residual- (i.e., post-processing) moisture content does not necessarily impact the RFL composition's elastic modulus, excessive moisture retained within the cord bundle may prevent the RFL from fully or homogeneously covering or bonding to the tensile cord, its yarns, fibers and interstices. This in turn is believed to detract from the RFL's effectiveness in improving belt growth resistance of the belt. Conversely, with regard to an exposure temperature or period that is too high for a particular RFL composition and/or cord type, it is believed that an undesirably low moisture content and/or degradation of the latex portion of the RFL composition occurs and correspondingly high cord stiffness results, thereby increasing the effective elastic modulus of the RFL cord treatment to an undesirably high level at which brittleness and its aforementioned associated problems occurs.

ILLUSTRATION I

To illustrate the effects of the present invention, toothed belts were formed, each having a 19 mm top width and 97 teeth (9.525 mm pitch) and measuring 932.925 mm in length, and comprising substantially identical HNBR belt body portions and a tensile cord formed of two carbon fiber yarns each having a tensile modulus of 250 GPa, a mass per unit length of 396 tex and a filament count of about 6000, available from Toray of Japan under the trademark TORAYCA-T400 HB 6K 40D. The belts differed in the particular RFL cord treatment composition and/or processing conditions (including drying temperature and/or exposure period) of the RFL cord treatment applied to the tensile cord, as set forth in Table 2 below. In each of the following examples and comparative examples set forth in Table 2 a common carboxylated HNBR-based high temperature resistant RFL solution described in Table 1 was employed, either as described above or as further modified as set forth in Table 2, (hereafter referred to as the "X-HNBR RFL composition").

TABLE 1

X-HNBR RFL Composition

| Material | Parts by Weight | Weight Percent (wet basis) |
|---|---|---|
| Deionized water | 88 | 21.03 |
| Ammonia (20.5%, aqueous) | 4 | 0.96 |
| Resorcinol, formaldehyde resin (75.0%, aqueous)[1] | 10 | 2.39 |
| Carboxylated HNBR latex (40% solids)[2] | 286 | 68.35 |
| Formaldehyde (37.0% solution) | 3.2 | 0.77 |

[1] PENACOLITE Resin R-2170 by Indspec Chemical
[2] ZETPOL B by Nippon Zeon.

To form the X-HNBR RFL described in Table 1, the aqueous ammonia was added to the water and stirred until blending was complete. Then, the resorcinol/formaldehyde resin was added to the thus-formed solution and was mixed until the resin was completely dissolved. The resulting resin mixture was adjusted as required with additional aqueous ammonia to a final pH of at least 9.0. This resin mixture was then added to the carboxylated HNBR latex and mixed until blending was complete. At that point the formaldehyde was added to the solution with stirring and the resultant solution was mixed well. The mixture was then aged for at least two hours, and the pH of the solution was adjusted as necessary with aqueous ammonia to a final pH of 9.0. Further aging for sixteen hours was allowed prior to utilization as the cord treatment.

In addition to the constituents set forth in Table 1, the X-HNBR RFL utilized in the particular examples and comparative examples set forth in Table 2 also included 4.3% by wet weight (18 parts by weight) of a 45% solids HEVEA-MUL M-111b wax dispersion by Heveatex, 6.50% by wet weight (27.2 parts by weight) of a 41% aqueous urea solution, and 2% by wet weight (8.4 parts by weight) of an antioxidant available under the name, AQUANOX 29 by Goodyear Chemical Co. These three constituents, i.e., wax, urea and antioxidant, are not required in the RFL solutions in accordance with the present invention, but may optionally be employed as process aids and/or, in the case of the antioxidant, to modify a property not relating to the scope of the present invention.

For each of Examples 4 and 6 and Comparative Example 5, the respective amount of carbon black shown in Table 2 was added to the X-HNBR RFL with mixing after the composition was aged for sixteen hours at this step. Where indicated in Table 2, the carbon black type utilized in the following illustration was a 35% solids dispersion available from J. C. Gadd Co. under the reference, BLACK SHIELD No. 4. In the practice of the present invention however, when carbon black is used to increase the elastic modulus of the RFL solution, any conventional or suitable reinforcing type may be employed, and it may be incorporated in the solution at any convenient step of the RFL manufacture, e.g., with the addition of the latex.

To determine the elastic modulus for the X-HNBR RFL compositions employed as cord treatments in the belts described in Table 2, film samples of the respective compositions were subjected to Dynamic Mechanical Analysis. Each of X-HNBR RFL compositions, in addition to the constituents set forth in Table 1, included 2% by weight wet basis of the composition, of the antioxidant described above.

Throughout the present disclosure including the appended claims, the term "elastic modulus" as applied to an RFL composition or cord treatment composition is used to denote that elastic modulus as obtained in accordance with the procedure set forth below, of the associated composition in its substantially dried state. This is distinguishable from the elastic modulus of such composition in its final form upon, about and within the interstices of a tensile cord, wherein any residual water from the latex or other sources may, if not substantially driven off in the processing steps, result in a decreased effective elastic modulus of the composition; or wherein exposure of the treated cord to excessive temperature for prolonged periods may result in degradation of the composition, particularly for those compositions employing low heat-resistant latex, e.g., VP/SBR.

Neither urea nor the wax dispersion that were utilized in each of the cord treatments was utilized in the RFL compositions for which elastic modulus values were obtained in this analysis. This modification is not believed to impact the resultant elastic modulus of the respective RFL compositions. In particular, the same elastomer latex was used in each case; the formaldehyde to resorcinol weight ratio in the RFL compositions was in each case 1.274; and the latex to resorcinol/formaldehyde resin weight ratio of the solutions was in each case 13.17.

The films were prepared by dipping a glass sample collector plate into vessels containing the respective RFL solutions, to obtain in each instance a film sample having a thickness of 0.05 mm and measuring 22.7 mm in length. The manufacturing steps for producing the X-HNBR RFL composition as described above were employed in forming the respective RFL solutions for this analysis. While the test specimens were dried for this analysis at an exposure temperature of only 50° C. in contrast to the higher temperatures to which the RFL compositions were exposed when utilized as a cord treatment as indicated in Table 2, it is believed that the test samples in each case were nonetheless substantially dried. This is because while relatively high temperatures are required to fully or substantially dry the RFL composition within the relatively massive and complex structure of a treated cord, relatively low temperatures are required to fully dry such compositions in the relatively small, flat and non-complex form represented by the sample slice.

Thus, it is anticipated that the effective elastic modulus ranges reported herein for these RFL composition test samples would be substantially consistent with the elastic modulus exhibited by RFL compositions of the same formulations utilized as cord treatments in the construction of toothed power transmission belts as reflected in Table 2, provided however that the processing conditions (including drying temperature and exposure period) for a given treated cord are selected to substantially dry the RFL composition without resulting in an excessively high cord stiffness, as further noted above and described in further detail below.

An RSA test apparatus set at 1.6 Hz, and 0.1% strain and set up in tension-tension mode was employed to analyze the cured RFL test samples. Elastic modulus was determined in a sweep across a temperature range of from about −70° C. to about 170° C. Results for temperature readings taken at 20° C. and at 100° C. are set forth below under the relevant headings in Table 2.

For each of the belts illustrated in Table 2, the X-HNBR RFL alone, or as modified in accordance with Table 2 to include minor proportions of carbon black added to the RFL composition, was applied as a cord treatment to the carbon fiber yarn described above as follows. In a first step, untwisted yarn was immersed into a tank containing the appropriate X-HNBR RFL or carbon black-modified-X-HNBR RFL solution. While any method may be used to apply the cord treatment to the cord in accordance with the subject invention, for these illustrative examples filaments of the carbon fiber yarns were spread during this impregnation step to increase the area of exposure of the fibers and thus increase the amount of RFL cord treatment applied thereto. This spreading was by means of passing the yarns around two pins each measuring 1 mm in diameter which were separated from one another by 34 mm, and were submerged in the RFL treatment and placed perpendicular to the path of the yarns, that created in the yarns the tendency to open and the filaments thereof to spread out so as to occupy most of the line of contact with the pin. Tension on the yarn while in the RFL composition-containing dip tank was controlled to 40 to 50 grams. The yarn was thereafter passed through a steel die having a 0.81 mm diameter upon removal from the tank to remove excess treatment and to enhance cord treatment penetration. The yarn was then passed through two ovens. Each measured 3 meters in length, and the dwell time of the yarn in each oven was 4.5 seconds. The average oven temperature within the first oven was 145.8° C. The average oven temperature within the second oven was approximately 231.5° C., 267.0° C. and 302.5° C. as indicated in the Table below. While not intending to be limited to any particular theory or practice, it is believed that exposing the treated cord to both a relatively lower first elevated temperature and a relatively higher second elevated temperature for sufficient exposure periods in accordance with the examples shown below provides one efficient means for drying the cord, i.e., eliminating substantial amounts of residual water from the latex portion of the RFL composition, and also causing at least a portion of the resorcinol-formaldehyde portion of the RFL composition to react with at least a portion of the latex portion of the RFL composition and of the carbon cord itself, thereby promoting adhesion of the cord treatment to the cord.

While two ovens were employed to process the treated cord for purposes of the examples set forth below, it should be readily understood that these operations could be accomplished in a single operation which may furthermore take place in a single oven or equivalent apparatus. The RFL pick-up, i.e., the amount of cord treatment applied to or within the yarn, upon emergence of the coated yarns from the second oven in each case described in Table 2 was between 20.45 and 21.0% based on dry final weight of the yarn. Cord treatment pick-up level was determined for purposes of this and all other Illustrations by measuring the weight increase of a ten (10) meter length yarn after cord treatment application and processing, and exposure of the treated and processed yarn to a 105° C. atmosphere for 16 hours.

Upon emergence from the drying oven, the stiffness of sample single coated yarns was determined by means of a Taber V-5 Stiffness Tester, as it is believed that the stiffness of the coated cord related to the elastic modulus of the cord treatment. For each of the coated yarns of the type utilized in this illustration and analyzed according to this method, a counterbalance of ten (10) measuring units was employed to yield a relative measure of cord stiffness. Results, where values were obtained, are reported in Table 2.

Moisture content of the thus-treated and processed cord, i.e., residual water contributed primarily by the latex portion of the RFL composition, was furthermore determined by measuring weight loss of a ten (10) meter section of the treated and processed yarn after exposure thereof to a 105° C. atmosphere for 16 hours, and the results furthermore provided below in Table 2.

For each example and comparative example, two of the thus-treated yarns were then twisted together under tension utilizing a METUMAT twisting machine (available from Memmingen Co.), at a rate of 80 twists per meter. The machine was set at 30% brake and a 600 g package let-off tension was used. The cord construction was a 6K-2, i.e., two 6000 filament TORAYCA-T400 HB 40D 6K yarns twisted together to form a cord.

An overcoat, comprising a 30% solids composition available from Henkel under the reference CHEMOSIL 2410, which was brought to 8.2% solids in xylene, was then applied to each of the cords to enhance the adhesion between the cords and the surrounding belt constituent members. To do so, the twisted cord was unwound under a tension of 1 kg, and immersed into a tank containing the aforementioned second treatment, and then passed through an oven measuring 8 meters in length, at 90° C., at a rate of 18 meters per minute. After drying, the cord was exposed to these same steps a second time. Pick-up level of this overcoat on the treated cord was less than 5% by dry weight of the treated yarn.

Two belts as described above for each of the examples and comparative examples set forth in Table 2 were built and analyzed as follows, and the results obtained for individual belts after 24 and 48 hours on test are provided. To determine permanent belt length growth as reported above in Table 2, each of the belts was trained about a rig 30 consisting of six pulleys 32, 40, 36, 38, 34, and 42 as shown in the schematic depiction provided in FIG. 3. Driver pulley 32 and pulley 40 each possessed 19 sprocket grooves for meshing with the belt teeth, at a 9.525 pitch. Pulley 36 possessed 20 sprocket grooves for meshing with the belt teeth, at a 9.525 pitch. Pulleys 34, 38 were plain, i.e., non-toothed pulleys each measuring 50 mm in diameter, and tensioned pulley 42 was plain and measured 70 mm in diameter. The test apparatus consisted of a chamber containing the test rig and within which the temperature was held at 100° C. throughout the test. The belts were operated on the rig in a counterclockwise direction under no load, at 6200 RPM applied at the driver pulley 32, and an installation tension applied at pulley 42 of 200 N, and belt length increases (i.e., belt growth) were measured for a single belt after twenty four hours on the test and then again after forty eight hours on the test as a percentage increase from the belt's original length at the end of each period. For purposes of and throughout this disclosure, this test will be referred to as the "High Temperature Belt Growth Analysis".

TABLE 2

| | Comparative Example 1 | Example 2 | Example 3 | Example 4 | Example 5 | Example 6 |
|---|---|---|---|---|---|---|
| Amount of Carbon black added to X-HNBR RFL Composition (Wt. %, wet) | 0.0 | 0.0 | 0.0 | 4.0 | 8.0 | 4.0 |

TABLE 2-continued

| | Comparative Example 1 | Example 2 | Example 3 | Example 4 | Example 5 | Example 6 |
|---|---|---|---|---|---|---|
| Elastic Modulus of RFL film at 20° C. (dynes/cm$^2$) | $5.7 \times 10^7$ | $5.7 \times 10^7$ | $5.7 \times 10^7$ | $1.0 \times 10^8$ | $8.2 \times 10^8$ | $1.0 \times 10^8$ |
| Elastic Modulus of RFL film at 100° C. (dyns/cm$^2$) | $2.2 \times 10^7$ | $2.2 \times 10^7$ | $2.2 \times 10^7$ | $3.5 \times 10^7$ | $1.6 \times 10^8$ | $3.5 \times 10^7$ |
| Average Oven Temp. Zone 1 (° C.) | 145.8 | 145.8 | 145.8 | 145.8 | 145.8 | 145.8 |
| Average Oven Temp. Zone 2 (° C.) | 231.5 | 267.0 | 302.5 | 231.5 | 231.5 | 267.0 |
| Cord moisture content (% H$^2$O) | 7.1% | 6.4% | 3.3% | 15.5% | 12.4% | 2.4% |
| Cord Stiffness (average) (10 unit counterbalance) | 56.4 | 58.0 | — | 73.6 | 82.4 | 86.0 |
| Belt growth after 24 hours (%) | 0.121 0.093 | 0.071 0.093 | 0.104 0.082 | 0.055 0.104 | 0.098 0.087 | 0.093 0.082 |
| Belt growth after 48 hours (%) | 0.132 0.115 | 0.071 0.093 | 0.098 0.109 | 0.044 0.082 | 0.131 0.093 | 0.087 0.099 |

The effects of varying the second stage drying temperature of the cord during the cord treatment process while holding the exposure period at that temperature constant for the same cord treatment RFL solution may be seen in the results for Comparative Example 1 and for Examples 2 and 3 reported in Table 2. These results indicate that at a second zone oven temperature of about 267° C. as described above, both 24-hour and 48-hour belt length increases as measured from the belt's original length are less than 0.1% (Example 2), while at both lower (Comparative Example 1) and higher (Example 3) second zone oven temperatures, belt length increases greater than 0.1% occur in one or more instances at both 24-hour and 48-hour readings. Thus, it can be seen that the elevated temperature to which the cord is exposed for a given exposure period and RFL composition during cord treatment processing impacts the final properties of the belt comprising the cord. Moreover, it can be seen that there exists an optimum temperature range for a given exposure period for this particular composition for which a minimum permanent belt length increase occurs for belts incorporating this cord.

While not intending to be limited to any particular theory, it is believed that a too low exposure temperature for this exposure period at this stage, e.g., of around 230° C. for Comparative Example 1, is believed to allow some portion of the latex component of the RFL to remain liquid, and/or to result in a degree of cure of the latex component that is too low, resulting in a relatively lower RFL modulus than that reported for the dried film sample. The former is supported by the respective moisture contents reported for, e.g., Comparative Example 1 and Example 2, and their respective belt growth results. A too high temperature at this stage and for this exposure period, e.g., of around 300° C., for Comparative Example 3, is believed to result in the elimination of a greater amount of water from the treated cord, but to a point wherein a very high a cord stiffness results, as described below. It is furthermore presently believed that excessively high temperature and/or exposure period may also affect a higher degree of cure of at least a portion of the latex component of the RFL sufficient to thus increase the effective elastic modulus of the RFL composition within and surrounding the treated cord compared to that reported for the dried film sample, to a similarly unsatisfactory level, as reflected in its reported belt growth result. Exposure to excessive or prolonged elevated temperature may moreover degrade the RFL, particularly for those compositions incorporating rubber latex with relatively low heat resistance. In either case, an unacceptable level of permanent belt length increase occurs.

This phenomenon is moreover apparent in the results reported for Examples 4 and 6, which differ only in the temperature to which the treated cord was exposed. While both belts exhibited excellent belt growth resistance, the Example 6 belt, containing only 2.4% residual moisture and concomitantly increased cord stiffness than that reported for Example 4 exhibited slightly poorer belt growth resistance than Example 4. Thus, it is believed that an excessively high cord stiffness and concomitantly low residual moisture content may hamper or preclude proper cord treatment coverage, but as illustrated above a relatively stiff cord actually results in significantly improved belt growth resistance compared to a belt comprising cord exhibiting relatively lower stiffness.

In the case of the RFL having a modulus that is too low, belt growth is believed to be due to the increased abrasion and wear experienced by individual filaments of the carbon fibers, which are not sufficiently protected by the low modulus RFL material, and hence leads to decreased strength of the tensile member.

In the case of the RFL having a modulus that is too high, it is believed that the filaments of the carbon fiber yarns become damaged as a result of the buckling of the yarns during twisting thereof after they are coated with the stiff RFL cord treatment. It is furthermore believed that the resulting cord stiffness of such extremely high modulus RFL material prevents the filaments of the carbon fiber yarns from efficiently and/or sufficiently packing together in their twisted configuration thus leaving a relatively large amount of void space in the belt composite structure. Consequently, as the belt is driven under load, this void space collapses and the belt exhibits growth, i.e., as measured in percent increase from its original length. Conversely, when exposed at this second stage to an optimal temperature for this exposure period and these particular constituents, e.g., around 267° C. for Example 2, it is believed that a beneficially reduced moisture content, and/or a degree of cure resulting in an optimal RFL elastic modulus is achieved, and a belt exhibiting minimum permanent belt growth results.

As with varying the degree of cure of the latex and/or the residual moisture (and hence cord stiffness) in the cord treatment, the addition of carbon black to an RFL composition has the effect of increasing the elastic modulus of the material. The effects of adding minor amounts of carbon black to RFL compositions at constant processing temperatures and exposure periods can be seen in the reported elastic modulus and belt growth results for Comparative Example 1 and for Examples 4 and 5 of Table 2. These results indicate that when no carbon black is added to the XHNBR-RFL composition (Comparative Example 1), permanent belt growth exceeding 0.1% occurs after both 24 hours and 48 hours on test. Similarly, when 8% by wet weight of carbon black is added to the XHNBR RFL composition (Example 5), permanent belt growth exceeding 0.1% occurs in one instance after 48 hours on test for the belt containing a significantly higher elastic modulus cord treatment. Adding 4% by wet weight of carbon black to the XHNBR RFL composition results in a composition elastic modulus between the former Comparative or non-Comparative Examples (Example 4), and, while indicating permanent belt length increase in one instance exceeding 0.1% after 24 hours, results in not more than 0.1% belt growth after 48 hours on the test. With regard to the belt growth results reported for Example 4, it will be observed that in one instance the level of belt growth actually decreased from the twenty-four hour reading to that taken after forty eight hours. While in general, belt growth increases with increasing time on the test, it is possible that in some instances a belt may exhibit some shrinkage e.g., due to the swelling of one or more elastomeric belt components and/or through measurement error. Thus, it can be seen that the addition of carbon black to the RFL cord treatment impacts the elastic modulus of the cord treatment and thereby the final properties of the belt comprising the cord treated with such cord treatment. Moreover, it can be seen that there exists an optimum level of carbon black for the RFL cord treatment for which a minimum permanent belt length increase occurs for belts incorporating the thus-treated cord.

In particular, for a given set of processing conditions (i.e., elevated temperature and exposure period), when either too little or too much carbon black is added to the X-HNBR RFL Composition, an unacceptable level of permanent belt growth occurs, which is believed in both cases to be due to the undesirable elastic modulus of the RFL cord treatment and concomitant problems associated therewith as described above. Conversely, when an optimal RFL modulus is achieved, e.g. through the addition of a proper amount of carbon black to the X-HNBR RFL Composition (i.e., 4 phr for Example 4), it can be seen that a minimum level of permanent belt growth occurs, particularly as reported in the 48-hour High Temperature Belt Growth test results. Thus, with relation to the particular constituents set forth in Table 1 as the X-HNBR RFL composition and for the processing conditions utilized for the relevant examples, if carbon black is utilized in accordance with the present invention to achieve the desired RFL elastic modulus, an amount of from about 0.5 to about 10 percent per wet weight of the RFL solution; more preferably of from about 2 to about 7.5 percent per wet weight; and most preferably of from about 3 to about 5 percent per wet basis weight is so employed.

Because a number of factors including elastomer latex type can be varied to affect the elastic modulus of the RFL composition, the skilled practitioner would readily recognize that the ranges provided above for the preferred amount of carbon black for addition to above-described X-HNBR RFL composition are not necessarily effective or sufficient for other compositions and/or for other treated cord processing conditions. Thus, when used to increase the elastic modulus of RFL compositions generally in accordance with the subject invention, amounts of carbon black up to about 25% by wet weight of the composition may be effective. Such amounts when employed are preferably from about 1% to about 20% by wet weight, and are most preferably from about 3 to about 15% by wet weight of the RFL composition.

Utilizing the results drawn from this analysis and consistent with the results for Examples 2, 4 and 6 reported above in Table 2, it is believed that an elastic modulus of the RFL cord treatment after exposure to processing conditions sufficient to eliminate substantial amounts of water from the RFL without adversely impacting the cord's stiffness as described above, or any other procedure(s) sufficient to so adequately and sufficiently dry the cord treatment such that its elastic modulus at a temperature of 20° C. is preferably in the range of from about $1.0 \times 10^7$ dynes/cm$^2$ ($1.0 \times 10^6$ Nm$^{-2}$) to about $5.0 \times 10^8$ dynes/cm$^2$ ($5.0 \times 10^7$ Nm$^{-2}$); is more preferably from about $3.0 \times 10^7$ dynes/cm$^2$ ($3.0 \times 10^6$ Nm$^{-2}$) to about $3.8 \times 10^8$ dynes/cm$^2$ ($3.8 \times 10^7$ Nm$^{-2}$); is more preferably from about $3.5 \times 10^7$ dynes/cm$^2$ ($3.5 \times 10^6$ Nm$^{-2}$) to about $3.5 \times 10^8$ dynes/cm$^2$ ($3.5 \times 10^7$ Nm$^{-2}$) and is most preferably from about $7.0 \times 10^7$ dynes/cm$^2$ ($7.0 \times 10^6$ Nm$^{-2}$) to about $3.0 \times 10^8$ dynes/cm$^2$ ($3.0 \times 10^7$ Nm$^{-2}$). At 100° C., the elastic modulus of the RFL cord treatment is preferably in the range of from about $5.0 \times 10^6$ dynes/cm$^2$ ($5.0 \times 10^5$ Nm$^{-2}$) to about $4.0 \times 10^8$ dynes/cm$^2$ ($4.0 \times 10^7$ Nm$^{-2}$); is more preferably from about $1.0 \times 10^7$ dynes/cm$^2$ ($1.0 \times 10^6$ Nm$^{-2}$) to about $2.5 \times 10^8$ dynes/cm$^2$ ($2.5 \times 10^7$ Nm$^{-2}$); is more preferably from about $1.8 \times 10^7$ dynes/cm$^2$ ($1.8 \times 10^6$ Nm$^{-2}$) to about $2.7 \times 10^8$ dynes/cm$^2$ ($2.7 \times 10^7$ Nm$^{-2}$); and is most preferably from about $2.5 \times 10^7$ dynes/cm$^2$ ($2.5 \times 10^6$ Nm$^{-2}$) to about $1.0 \times 10^8$ dynes/cm$^2$ ($1.0 \times 10^7$ Nm$^{-2}$).

As described above, any method for bringing the elastic modulus of the RFL solution to within the ranges found herein to be effective could equally well be employed in the practice of the present invention. Thus for example it has been found that increasing the formaldehyde:resorcinol weight ratio of the RFL has the effect of increasing the RFL modulus. For example, a formaldehyde:resorcinol weight ratio for the composition described in Table 1 as the X-HNBR RFL composition of from about 0.75 to about 2.0; and preferably from about 1.0 to about 1.75; and most preferably of from about 1.1 to about 1.4 may be established to result in a dried composition exhibiting an elastic modulus within the effective ranges set forth above. Furthermore, as indicated above, a blocked isocyanate composition may be added to the RFL solution to increase its modulus. Thus for example, to the constituents set forth in Table 1 as the X-HNBR RFL composition, a blocked isocyanate at a 50% solids level available under the reference GRILBOND IL-6 available from EMS Company was added to increase the resultant dried elastic modulus of the composition. Suitable amounts of a 50% solids material for utilization in the composition described in Table 1 may be from 0 to 25 parts per hundred weight of elastomer ("phr"); more preferably from about 2 to about 15 phr; and most preferably from about 5 to about 10 phr, such that an amount of blocked isocyanate added to the RFL solution is preferably from about 4.6 to about 9.3% based on dry weight of the RFL composition.

In addition, the elastic modulus of the RFL composition in its dried form may be increased through the manipulation of the weight ratio of the elastomer latex component in relation to the resorcinol/formaldehyde resin ("RF resin") component in the RFL solution. Thus for example with regard to the constituents set forth above in Table 1, the weight ratio of the latex to the RF resin was 13.17, but may be from about 5 to about 20; more preferably from about 7.5 to about 17, and most preferably from about 10 to about 15. Moreover, the latex component of the RFL composition may be substituted in total or in part with a second elastomer latex, or with a combination of any two or more elastomer latexes, to effect the final dried RFL elastic modulus. Examples indicating the effects according to this particular embodiment are provided below in Illustration II.

The skilled practitioner will readily recognize that any number of techniques for manipulating the RFL cord treatment's elastic modulus could thus be employed in accordance with the subject invention, and moreover that two or more of the above-described non-limiting techniques could be combined for a given RFL composition to achieve the effective RFL elastic modulus level described above. Thus for example, as indicated in the following Illustration II, the effective amount of carbon black for bringing the elastic modulus of an RFL composition within the effective range may vary with the particular type of elastomer latex employed in the RFL solution. As indicated for example in the results provided in Illustration II below, when a non-carboxylated HNBR elastomer latex was substituted for the carboxylated HNBR utilized in an RFL composition otherwise substantially similar to that set forth in Table 1, it was found in accordance with the procedure set forth above, that the resultant composition's elastic modulus at both 20° C. and at 100° C. was higher than that exhibited by the composition that utilized carboxylated HNBR as its elastomer latex component.

ILLUSTRATION II

It is anticipated that toothed power transmission belts employing carbon fiber tensile cord members as described above and employing as a cord treatment an RFL composition exhibiting an elastic modulus within the effective ranges set forth above would exhibit reduced belt growth of not more than 0.1% based on their original belt length as measured after 48 hours under the 100° C. High Temperature Belt Growth Analysis, and that such belts employing carbon fiber tensile cord members treated with an RFL composition exhibiting an elastic modulus outside the effective ranges set forth above would exhibit belt growth as measured according to that technique, of greater than 0.1%. To illustrate this, carbon fiber tensile cord substantially as described above for Illustration I but modified as set forth below, and incorporating as its carbon fiber cord treatment the RFL Compositions shown in Table 3 modified as described below were prepared for incorporation in toothed power transmission belts substantially as described above under Illustration I.

To illustrate the effects of elastomer latex type, cord tensile modulus, and processing conditions on the elastic modulus of an RFL composition and/or resultant belt growth exhibited by sample belts, additional RFL compositions prepared substantially as described above for the X-HNBR RFL Composition of Table 1, but employing in place of the carboxylated HNBR latex another single elastomer latex type, or combination of two elastomer latex types were prepared. In each instance a formaldehyde:resorcinol ratio of 1.274 and a latex:resorcinol-formaldehyde resin ratio of 13.17 was established for the RFL Composition, A non-carboxylated HNBR latex available under the reference ZETPOL A by Nippon Zeon at 285.86 parts by weight was substituted in one RFL composition, hereafter referred to in this disclosure as the "HNBR RFL Composition", which furthermore comprised only 52 parts by weight of deionized water instead of 88 parts by weight as shown for the RFL Composition in Table 1. While only 52 parts by weight of water were utilized for this particular example, it may be preferable in some circumstances that additional water be employed, for example to improve solution stability and shelf life, such that a solids level expressed in terms of wet basis weight percent for the final RFL solution composition is generally from about 25 to 35; more preferably from about 27 to 35, and is most preferably from about 30 to 33.

For a next example, a first combination, hereafter referred to within this disclosure as the "XHNBR-VP/SBR RFL Composition", utilized a combination of 143 parts by weight of the 40% solids carboxylated HNBR latex utilized in the RFL formulation described in Table 1 and 140 parts of a 41% solids VP/SBR latex available under the reference GENTAC FS118 by Omnova Solutions as the elastomer latex portion of the RFL composition.

For a next example, hereafter referred to within this disclosure as "XHNBR/EPDM RFL Composition", a combination of 142.93 parts by weight of that 40% solids carboxylated HNBR latex utilized in the RFL composition described in Table 1 and 115.20 parts of a 50% solids EPDM latex available under the reference CHEMLOK E0872 (presently EP872) by The Lord Corporation was utilized as the elastomer latex portion of the RFL composition, which employed 52 parts by weight of deionized water instead of 88 parts by weight as shown in Table I.

For a next example, hereafter referred to within this disclosure as the "EPDM RFL Composition", 180 parts by weight of the 50% solids EPDM latex available under the reference CHEMLOK EP872 by The Lord Corporation was utilized as the elastomer latex portion of the RFL composition, which employed 182 parts by weight of deionized water instead of 88 parts by weight as shown in Table I, and furthermore employed only 1 part by weight of the aqueous ammonia, 8 parts by weight of resorcinol formaldehyde resin and 2.5 parts by weight of formaldehyde. This difference in respective quantities of constituents was due to the higher solids content relative the other exemplary RFL Compositions, and the resultantly greater instability thereof. The composition was prepared however substantially in accordance with the description provided with regard to the RFL composition described in Table 1.

In addition to the constituents described above, each of the compositions utilized in the particular illustration summarized in Table 3 for use as the cord treatment in each reported instance also included as optional constituents 4.3% by wet weight (18 parts by weight) of a 45% solids HEVEAMUL M-111b wax dispersion by Heveatex, and 6.50% by wet weight (27.2 parts by weight) of a 41% aqueous urea solution. Where the utilization of an antioxidant is indicated in Table 3, 2% by weight wet basis (8.4 parts by weight) of an antioxidant available under the name, AQUANOX 29 by Goodyear Chemical Co. was employed. Where the utilization of carbon black is indicated, the same type and relative proportion thereof described above under Illustration I was employed. For those compositions comprising VP/SBR, the VP/SBR utilized was a 41% solids type available under the reference VP106S from Goodyear Chemical.

Each of the compositions for which belt growth data is provided in Table 3 below was applied to the carbon fiber yarns in accordance with the description provided above for Illustration I, except as and to the extent noted below. These compositions were modified however with varying carbon black or antioxidant levels or process temperatures or exposure periods as shown in Table 3, in order to illustrate the impact of RFL composition elastic modulus on the degree of belt growth observed.

In addition to the particular carbon fiber type utilized above in Illustration I (hereafter referred to within this disclosure as "T400"), a second carbon fiber type, available from Toray under the reference TORAYCA-T700 GC 12K 41E, having a tensile modulus of 230 GPa, a mass per unit length of 800 tex and a filament count of 12000, (hereafter referred to within this disclosure as "T700"), was utilized as indicated in the Table below.

In each case the T400 or T700 yarn was passed upon emergence from the immersion- or dip tank containing the respective RFL composition through a die measuring 1.1 mm in diameter, and then through a first drying oven at the temperature shown in Table 5 and measuring 3 meters in length at a rate of 30 meters per minute, and then through the second, curing oven at the temperature shown above and measuring 5 meters at a rate of 30 meters per minute. The T400 yarns were further processed as set forth above under Illustration I, but the T700 yarns were twisted singly and not in pairs, at a rate of 80 turns per meter under a tension of about 50 kg, and the resultant cords were treated with CHEMOSIL 2410 as an overcoat as described in Illustration I. For the EPDM RFL composition Examples 11 and 12, a twist of 60 turns per meter was employed. Moreover, a tension of 100 g was maintained for the T700 cord for immersion thereof through the RFL cord treatment-containing dip tank.

For determining elastic modulus, neither the wax dispersion, the antioxidant, nor urea as utilized in the RFL Composition cord treatment for the belt specimens described in Table 3 were utilized in the RFL compositions test samples from which elastic modulus measurements were taken and results reported in Table 3. Again, this is believed to have no impact on the respective elastic moduli of the composition in its various forms, except as described under Illustration I in relation to the cord treatment processing conditions. Test samples were prepared in accordance with the procedure set forth above in Illustration I for determining the elastic modulus in each instance under a range of temperatures and in accordance with the procedure therefor as described above, and the results recorded below in Table 3.

Stiffness of single coated yarns was again ascertained for several of the examples and comparative examples described below, upon emergence thereof from the RFL dip tank and processing ovens, and the results, where obtained, are set forth in the Table below. For those examples and comparative examples employing T700 cord however, a Taber V-5 Stiffness Tester counterbalance of 500 measuring units was employed, since the greater mass of this cord relative the T400 cord necessitated the utilization of a greater counterbalance in order obtain meaningful relative results. Moisture content and cord treatment pick-up level of the processed cord specimens were determined in each case in accordance with the procedure set forth above for Illustration I.

Belt growth results were obtained in accordance with the procedure described above in relation to Illustration I, with the exception that results were obtained after 100 hours on test, instead of at 48 hours on test. This measurement is believed to be more rigorous than the 48 hour value. In general, it has been found that with proper process conditions, i.e., drying of the treated cord as described herein, by 100 hours on test the rate of belt growth is constant. Conversely, for cord that is improperly processed, e.g., insufficiently and/or unevenly dried, or having insufficient RFL pick-up, belt growth does not generally stabilize and continues to be high. Moreover, except under very rare circumstances noted above, a belt exhibiting belt growth less than 0.1% after 100 hours on the test likewise exhibited belt growth less than 0.1% after only 48 hours on the test.

TABLE 3

|  | Example 7 | Example 8 | Example 9 | Example 10 | Example 11 | Example 12 |
| --- | --- | --- | --- | --- | --- | --- |
| Carbon Fiber Type | T400 | T700 | T700 | T700 | T700 | T700 |
| RFL Cord Treatment | HNBR RFL | HNBR RFL | HNBR/VPSBR RFL | HNBR/EPDM RFL | EPDM RFL | EPDM RFL |
| Carbon Black added (phr) | 0.0 | 0.0 | 4.0 | 0.0 | 0.0 | 0.0 |
| Antioxidant added (phr) | 0.0 | 0.0 | 2.0 | 0.0 | 0.0 | 0.0 |
| Elastic Modulus at 20° C. (dynes/cm$^2$) | $3.9 \times 10^8$ | $3.9 \times 10^8$ | $2.0 \times 10^{8*}$ | $2.3 \times 10^8$ | $3.8 \times 10^7$ | $3.8 \times 10^7$ |
| Elastic Modulus at 100° C. (dynes/cm$^2$) | $2.3 \times 10^8$ | $2.3 \times 10^8$ | $7.6 \times 10^{7*}$ | $6.9 \times 10^7$ | $1.95 \times 10^7$ | $1.95 \times 10^7$ |

TABLE 3-continued

|  | Example 7 | Example 8 | Example 9 | Example 10 | Example 11 | Example 12 |
|---|---|---|---|---|---|---|
| Average Oven Temp Zone 1 (° C.) & Exposure period (s) | 145.8° C. for 4.5 seconds | 145.8° C. for 6.0 seconds | 145.8° C. for 6.0 seconds | 145.8° C. for 6.0 seconds | 145.8° C. for 6.0 seconds | 120° C. for 12.0 seconds |
| Average Oven Temp. Zone 2 (° C.) & Exposure period (s) | 267.0° C. for 4.5 seconds | 249.3° C. for 6.0 seconds | 249.3° C. for 6.0 seconds | 249.3° C. for 6.0 seconds | 286.5° C. for 6.0 seconds | 225° C. for 12.0 seconds |
| Cord Treament pick-up level (dry wt. %) | 21.0 | 16.5 | 17.2 | 16.9 | 12.7 | 11.8 |
| Cord Residual Moisture Content (%) | 6.0 | 25.3 | 16.9 | 8.3 | 17.7 | — |
| Cord Stiffness | 74.2 | 16.8 | 13.1 | — | 6.3 | 9.8 |
| Belt growth at 100 hours | 0.082 | 0.082 | 0.057 | 0.087 | 0.055 | 0.037 |

*Elastic modulus value reported for HNBR/VPSBR RFL Composition obtained from composition prior to carbon black and antioxidant addition. The actual elastic modulus for the RFL cord treatment anticipated to be higher than the values reported in Table 3, as suggested in the data provided in Table 2 for XHNBR-RFL with and without carbon black and antioxidant.

As compared to the elastic modulus results reported in Table 2 for the XHNBR RFL Composition, the results reported in Table 3 for the HNBR RFL Composition indicate that the substitution of a non-carboxylated HNBR for the carboxylated HNBR in otherwise substantially similar compositions has the effect of increasing dramatically the elastic modulus of the resultant RFL composition. Notably however, while this increased elastic modulus might otherwise be anticipated to result in an increased tendency toward belt growth in comparison to, e.g., Example 2 of Table 2, Example 7, incorporating a relatively higher elastic modulus cord treatment, exhibited similarly low belt growth. It is presently believed that this is due to the low residual moisture and concomitantly higher cord stiffness as reported for Example 7 in comparison to the slightly higher corresponding values obtained for Example 2. Thus, while the elastic modulus value reported for an RFL compositions is a factor in determining resistance to belt growth, the moisture content and related cord stiffness of the processed cord is believed to be similarly relevant to such determination, with decreasing moisture (and hence increasing stiffness) to a certain point resulting in decreased permanent growth. Example 8 illustrates the utilization of the same HNBR RFL composition as utilized for Example 7, but as applied to the relatively more massive and complex T700 cord and therefore incorporating modified cord processing parameters, i.e., a slightly lower processing temperature and slightly longer exposure periods. Again, excellent belt growth results after 100 hours on test are obtained, even for this relatively higher modulus RFL composition. Notably, excellent belt growth values are obtained despite what would appear to be relatively high moisture content. It is believed that this more massive cord structure may accommodate greater residual moisture content without adverse impact on belt growth resistance compared to the less massive T400 cord.

Comparing the elastic modulus results reported in Table 3 for both XHNBR-VP/SBR RFL Compositions to those obtained for the XHNBR RFL Composition in Table 2, one sees that the substitution of 50% by weight of the carboxylated HNBR latex with a VP/SBR latex in otherwise substantially similar compositions similarly has the effect of increasing the elastic modulus of the resultant composition, but not to the extent exhibited by the substitution for the XHNBR in its entirety with HNBR. Again however and despite the higher elastic modulus of the cord treatment in relation to, e.g., that reported for Example 2 above in Table 2, the sample belts for Example 10 exhibited excellent resistance to belt growth after 100 hours on test. This is believed again to be attributable to the relatively low residual moisture content and concomitantly higher cord stiffness value reported for this example.

In relation to the application of the RFL Composition to the cord's yarns and/or its filaments, it has thus been found that the elimination of as great amount of water as possible is beneficial with regard to decreasing the belt's tendency to grow with prolonged use. Generally, it is thus preferred that upon completion of the treated cord processing steps, a residual moisture content as determined in accordance with the procedure utilized herein and described above, be less than about 50% by weight. In a further embodiment of the present invention, the residual moisture content is less than about 30% by weight, and in yet a further embodiment, is in the range of from about 1 to about 25% by weight.

As compared to the results obtained for the XHNBR RFL Composition in Table 2, the results reported in Table 3 for the XHNBR/EPDM RFL Composition indicate that the substitution of 50% by weight of the carboxylated HNBR latex utilized in the XHNBR RFL composition described in Table 1 with an EPDM latex similarly has the effect of increasing the elastic modulus of the resultant composition, but again, not to the degree exhibited by the substitution for the XHNBR in its entirety with HNBR. Again, excellent belt growth values are obtained in these EPDM-based Examples 11 and 12. Most notably, for Example 12 incorporating lower cord treatment temperatures and longer exposure periods exhibits among the lowest belt growth values observed to date. This suggests that a relatively gradual elimination of water from the RFL composition in the cord treating process may further improve belt growth resistance.

While the specific examples provided in Illustration I above utilize a single carbon fiber type, any other carbon fiber type could likewise be utilized within the scope of the present invention. For example, the T700 carbon fiber type available from Toray included in the present illustration has likewise provided positive results in accordance with the subject invention. One of ordinary skill in the art would readily appreciate that since this particular material possesses a higher filament count than the fiber utilized in the foregoing illustrations and only a single yarn is beneficially employed to form the tensile cord for belts employing this type, and since the yarn itself is larger than that employed in the illustrations, the optimum exposure temperature of the impregnated yarns upon emergence from the cord treatment tank during the yarn treatment process steps would likely be different from those set forth above for the T400 yarn in order to achieve the minimum belt growth for belts incorporating such cord. Such modifications would be well within the skill of the practitioner in the art, and fall within the scope of the present invention, and are reflected e.g., in the second zone oven temperatures for those test specimens employing T700 cord in Table 3 above.

ILLUSTRATION III

To further illustrate the effects of tensile cord modulus on the permanent belt length changes with constant RFL cured elastic modulus, four toothed belts as described above under Illustration I in relation to Tables 1 and 2, were formed. In each case, HNBR belt body portions were utilized, and RFL cord treatment according to the description for Example 4 of Table 1 was utilized as the cord treatment for all belts in accordance with the cord treatment steps described above under Illustration I. The overcoat of CHEMOSIL 2410 (by Henkel) was similarly utilized as described above.

Two Belt 1 belts included as their tensile member the 6K-2 cord formed of T400 yarns, possessing a tensile modulus of 250 GPa, a mass per unit length of 396 tex and a filament count of 12,000, while the two Comparative Belt 2 belts included as their tensile member a 6K-2 cord formed of carbon fiber available from Toray under the name Toray M40B 6K 50B and possessing a tensile modulus of 392 GPa, a mass per unit length of 364 tex and a filament count of 12,000. The yarns for the cord in both instances were twisted in the same manner as described above in relation to the Examples and Comparative Examples of Tables 2 and 3.

To determine belt length increases, both Belt 1 and Comparative Belt 2 were subjected to the same belt length variation test described above, i.e., the High Temperature Belt Growth Analysis performed at 100° C., but for extended test periods. After 100 hours on the test, both Belt 1 belts exhibited less than 0.15% belt growth, while both Comparative Belt 2 belts exhibited more than 0.175% increase from its original length. Notably, the level of belt growth exhibited by both of the Belt 1 belts decreased at the 200 hour mark compared to their performance after 100 hours on the test, while a Comparative Belt 2 belt exhibited greater than 0.2% belt growth at the 200 hour mark. Even after 300 hours on test, neither of the Belt 1 belts exhibited belt growth greater than 0.15%. Thus, the effect of tensile cord modulus on the degree of belt growth exhibited by the toothed belts incorporating such tensile cord has been shown.

In addition to the marked improvement in belt growth resistance exhibited by power transmission belts constructed in accordance with one or more embodiments of the present invention, such belts comprising a tensile cord formed of carbon fiber and having a cord treatment possessing a dried elastic modulus as provided herein furthermore exhibit overall excellent performance properties, including but not limited to high load capacity and flexural fatigue resistance and tensile strength retention, in large part exceeding the performance of reinforcement materials conventionally employed in toothed belts intended for high load application, e.g., aramid and glass fiber.

For example, carbon fiber reinforced toothed power transmission belts constructed in accordance with an embodiment of the invention and furthermore in accordance with the description provided herein for FIG. 1 have been found to exhibit more than five hundred hours on an engine running test, wherein belt loading on the test was at slightly greater than 8N per tooth per millimeter of belt width, operating at 4000 rpm under an effective tension of 2500N. This was more than three times the life to failure exhibited by a comparable belt comprising a tensile cord of the same diameter but formed of another material, i.e., glass. Such carbon-fiber reinforced toothed belts in accordance with an embodiment of the invention moreover exhibited more than 66% retained tensile strength; almost 40% greater retained tensile strength compared to such glass-reinforced belts; after 800 hours on the High Temperature Belt Growth Analysis described above.

ILLUSTRATION IV

It has been found that timing belts constructed in accordance with one or more embodiments of the present invention provide significant improvement in one or more specific performance areas when utilized to drive a camshaft in an internal combustion engine, and particularly in automotive internal combustion engines. In particular, these belts have been found to significantly reduce undesirable angular vibration of an automotive engine camshaft in relation to an associated crankshaft with engine operation. What is meant by the term "angular vibration" in the present context is that rotational vibration of the camshaft, i.e., vibration of the shaft about it's longitudinal axis; that may be caused for example by any or all of the torsional vibration exhibited by the camshaft resulting from an applied twisting force along its length, or by the free body rotation of the camshaft itself, or by the cyclic- or periodic angular velocity superimposed upon the mean camshaft speed by the non-uniform or non-constant nature of an applied drive torque. Moreover, at certain crankshaft speeds for a given engine, larger amplitudes of such camshaft angular vibration generally occur due to the excitation of one or more drive system resonant frequencies at such speeds.

To further illustrate effects and aspects of the present invention in providing a method for significantly reducing undesirable angular vibration of a camshaft in relation to a crankshaft in a camshaft driven internal combustion engine, two belts as described above in relation to Illustration I were constructed, each having substantially identical fiber-loaded HNBR belt body portions but differing in their respective tensile members. The average modulus of the cured fiber-loaded HNBR body portions at 100% elongation was 12.5 MPa (the average result being that of the with- and against rubber calendar directions, in view of the slight anisotropy of the cured rubber due to the presence of substantially randomly oriented fibers therein). Belt 3 included as its tensile cord T700 carbon fiber cord available from Toray to which was applied the HNBR RFL cord treatment composition as described above in relation to Illustration II. The cord treatment was applied substantially as described above in relation to Illustration I, but with a first exposure temperature after application of the treatment of 120° C. and a second exposure temperature of 230° C. The Comparative Belt 4 specimen included as its tensile member a cord of substantially the same diameter as that of Belt 3, i.e., 7 micrometers, but in this case formed of U glass and having a 22 tex×3×18 construction, and having a tensile modulus of 92 GPa. A proprietary treatment was applied to the cord for Comparative Belt 4, available under the designation IO22, as supplied by Nippon Glass Fiber.

To illustrate the effect of the belt in accordance with an aspect of the invention in reducing the relative angular vibration of a camshaft in relation to a crankshaft in an automotive internal combustion engine, each of Belt 3 and Comparative Belt 4 was trained about a 4-cylinder unit injector motored engine test rig 50, schematically represented in FIG. 3, consisting of a forty-four toothed camshaft 52, a nineteen-toothed water pump pulley 54, a twenty-two toothed crankshaft 56, an idler 58 and a seventy-two millimeter diameter tensioner pulley 60, wherein each of the above components was characterized by a pitch of 9.525 mm. The rig was operated with the tested belt driving the camshaft and being driven by the crankshaft, at an ambient temperature of 120° C., a maximum effective tension of 4500N, and a load of 150 N/mm applied at the 30 mm pulley. The available power for the engine was from 115 to 150 hp. The normal operating speed for the particular engine utilized in the test was in the range of 2700–3000 rpm, with critical speed in the range of from 4000 to 4500 rpm. For the test, the engine was run from idle to its maximum speed of approximately 5000 rpm, and the angular vibration of the camshaft in relation to the crankshaft was recorded for those engine orders of vibration relevant to the firing impulses—in the case of the particular four-cylinder test engine utilized in the subject test, in the second and fourth orders. The results are provided in FIG. 4, wherein the vertical axis denotes peak vibration of the camshaft in degrees, and the horizontal axis denotes crankshaft rotations per minute. In FIG. 4, the two curves indicating the relatively higher vibration levels pertain to the second firing order results for the Belt 3 and Comparative Belt 4 tests, and the two curves indicating the relatively lower peak vibration curves pertain to the fourth firing order results for the Belt 3 and Comparative Belt 4 tests.

One of ordinary skill in the relevant art would readily appreciate the desirability of both decreasing the level of angular vibration of the camshaft in relation to the crankshaft, and of shifting the peak relative angular vibration level to a point either above or below the normal operating speed of the engine as well as any major critical speed thereof, i.e., any speed at which resonance occurs. One may observe from the results shown in FIG. 4 that in comparison to Comparative Belt 4, the Belt 3 specimen provides both a dramatic reduction in overall angular vibration of the camshaft in relation to the crankshaft for the second firing order in the critical area of 4000 to 4500 rpm, as well as a shift in peak relative angular vibration for the fourth firing order away from the normal engine operating range.

Thus, by providing a durable, low growth timing belt comprising a cured non-castable elastomer belt body portion and a tensile member formed of a cord comprising at least one yarn formed of carbon fiber in accordance with an embodiment of the present invention, a method is provided for reducing the vibration of a camshaft in relation to a crankshaft in an internal combustion engine wherein the camshaft is driven by the toothed belt.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element that is not specifically disclosed herein.

What is claimed is:

1. A process for reducing the angular vibration of a camshaft in relation to a crankshaft in an internal combustion engine wherein the camshaft is driven by a toothed belt comprising a cured elastomer belt body portion and a tensile member formed of a helically spiraled cord embedded therein; a cord treatment composition comprising an elastomer latex coating at least a portion of said cord, and characterized in that said process comprises the steps of:
   a. selecting for said cord at least one yarn comprising a carbon fiber;
   b. incorporating in said cord treatment composition a resorcinol-formaldehyde reaction product;
   c. selecting the elastic modulus of said cord treatment composition at a temperature of 20° C. to be within the range of from about $1.0 \times 10^7$ dynes/cm$^2$ to about $5.0 \times 10^8$ dynes/cm$^2$, and at a temperature of 100° C. to be within the range of from about $5.0 \times 10^6$ dynes/cm$^2$ to about $4.0 \times 10^8$ dynes/cm$^2$
   d. applying said cord treatment composition to the cord to form a treated cord;
   e. incorporating the treated cord into an un-cured elastomer composition to form an assembly; and
   f. curing the assembly to form said toothed belt.

2. The process of claim 1 further comprising the step of selecting the tensile modulus of the cord to be in the range of from about 100 to about 300 GPa.

3. The process of claim 1 further comprising the step of selecting the tensile modulus of the cord to be in the range of from about 150 to about 275 GPa.

4. The process of claim 1 wherein the cured elastomer belt body portion comprises at least one elastomer selected from:
   a. hydrogenated acrylonitrile butadiene elastomer;
   b. polychloroprene;
   c. acrylonitrile butadiene rubber;
   d. styrene-butadiene rubber;
   e. alkylated chlorosulfonated polyethylene;
   f. epichlorohydrin,
   g. butadiene rubber,
   h. polyisoprene; and
   i. ethylene alpha olefin elastomer.

5. The process of claim 4 wherein said elastomer belt body portion further comprises from about 0.5 to about 20 parts per hundred weight of elastomer of fibers.

6. The process of claim 1 wherein said elastomer latex of said cord treatment composition is at least one selected from:
   a. hydrogenated acrylonitrile butadiene rubber latex;
   b. acrylonitrile butadiene rubber latex;
   c. carboxylated hydrogenated acrylonitrile butadiene rubber latex;
   d. carboxylated acrylonitrile butadiene rubber latex
   e. vinyl pyridine/styrene butadiene rubber latex;
   f. carboxylated vinyl pyridine/styrene butadiene rubber latex;
   g. styrene butadiene rubber latex;
   h. chlorosulfonated polyethylene rubber latex; and
   i. ethylene alpha olefin rubber latex.

7. The process of claim 1 further comprising the step of exposing said treated cord to a condition sufficient to bring the water content of said cord treatment to less than about 50% by weight based on said weight of said treated cord, to form a processed treated cord.

8. The process of claim 7 wherein said condition comprises a temperature and an exposure period to said temperature and said water content is brought to less than about 30% by weight.

9. The process of claim 7 wherein said water content is brought to a level in the range of from about 1% to about 25% by weight.

10. The process of claim 1 wherein said cord treatment is applied to said carbon fiber to achieve a cord treatment pick-up level on said carbon fiber in the range of from about 5.5% to about 30% based on the final dry fabric weight.

11. The process of claim 1 further comprising the step of applying an overcoat comprising a rubber-textile adhesive to said treated cord.

12. The process of claim 1 further comprising the steps of selecting said carbon fiber yarn to have a filament count in the range of from about 1000 to about 24000; and selecting said cord to possess a filament count in the range of from about 5000 to about 24000.

13. The process of claim 1 wherein said belt further comprises a fabric cover element disposed along at least one of a belt back surface and a belt toothed surface.

* * * * *